US008726849B1

(12) United States Patent
Billig et al.

(10) Patent No.: US 8,726,849 B1
(45) Date of Patent: May 20, 2014

(54) BIRD COLLAR

(76) Inventors: Kathy L. Billig, Madison, OH (US); Merilyn LaMarsh, Ashtabula, OH (US)

( * ) Notice: Subject to any disclaimer, the term of this patent is extended or adjusted under 35 U.S.C. 154(b) by 13 days.

(21) Appl. No.: 13/586,291

(22) Filed: Aug. 15, 2012

(51) Int. Cl.
*A01K 27/00* (2006.01)

(52) U.S. Cl.
USPC ............ 119/853; 119/856; 119/860; 119/865

(58) Field of Classification Search
USPC ......... 119/853, 850, 856, 858, 859, 860, 863, 119/865; 2/162, 170
See application file for complete search history.

(56) References Cited

U.S. PATENT DOCUMENTS

| | | | | | |
|---|---|---|---|---|---|
| 911,326 | A | * | 2/1909 | Paroubek | 602/64 |
| 923,217 | A | * | 6/1909 | Tyrrell | 602/64 |
| 950,143 | A | | 2/1910 | Saxe | |
| 2,808,030 | A | * | 10/1957 | Costanzo | 119/860 |
| 3,477,409 | A | * | 11/1969 | Costanzo | 119/174 |
| 3,726,525 | A | * | 4/1973 | Jackson | 473/61 |
| 3,814,061 | A | * | 6/1974 | Aries et al. | 119/654 |
| 4,048,991 | A | * | 9/1977 | Marx | 602/64 |
| 4,068,624 | A | * | 1/1978 | Ramney | 119/654 |
| 4,091,766 | A | * | 5/1978 | Colliard | 359/518 |
| 4,141,322 | A | * | 2/1979 | Evans et al. | 119/654 |
| 4,178,879 | A | * | 12/1979 | Cunningham | 119/858 |
| 4,208,986 | A | * | 6/1980 | Costanzo | 119/860 |
| 4,224,901 | A | * | 9/1980 | Carey, Jr. | 119/654 |
| 4,414,969 | A | * | 11/1983 | Heyman | 128/878 |
| 4,481,942 | A | * | 11/1984 | Duncan | 128/878 |
| 4,648,130 | A | * | 3/1987 | Kuznetz | 455/351 |
| 4,688,564 | A | * | 8/1987 | Kelly | 128/878 |
| 4,762,320 | A | * | 8/1988 | Larsen | 473/62 |
| 4,829,604 | A | * | 5/1989 | Allen et al. | 2/170 |
| 4,926,784 | A | * | 5/1990 | Brightful et al. | 119/860 |
| 5,009,347 | A | * | 4/1991 | Phelps | 224/219 |
| 5,036,838 | A | * | 8/1991 | Sherman | 602/44 |
| 5,144,913 | A | * | 9/1992 | Yasui | 119/860 |
| D368,331 | S | * | 3/1996 | Chiang | D29/121.1 |
| D368,332 | S | * | 3/1996 | Chiang | D29/121.1 |
| 5,617,589 | A | * | 4/1997 | Lacore et al. | 2/452 |
| 5,647,061 | A | * | 7/1997 | Marcus | 2/11 |
| 5,697,328 | A | | 12/1997 | Hunter | |
| 5,797,354 | A | | 8/1998 | Marschall | |
| 5,970,921 | A | * | 10/1999 | Fulton | 119/858 |
| 6,080,124 | A | * | 6/2000 | Falk et al. | 602/26 |
| 6,101,981 | A | * | 8/2000 | Friend et al. | 119/860 |
| 6,108,876 | A | * | 8/2000 | Hubbert | 24/265 WS |
| 6,120,472 | A | * | 9/2000 | Singer, Jr. | 602/64 |
| 6,173,866 | B1 | * | 1/2001 | Taylor et al. | 222/175 |
| 6,234,118 | B1 | * | 5/2001 | Lahens | 119/860 |

(Continued)

OTHER PUBLICATIONS

Bird E-Collar 4.75-5.5"/12"DIA.Amazon.com http://www.amazon.com/BIRD-E-COLLAR-4-75-5-5-12-DIA/dp/B005OB6THI.

*Primary Examiner* — Yvonne Abbott
(74) *Attorney, Agent, or Firm* — Montgomery Patent & Design; Robert C. Montgomery

(57) ABSTRACT

A bird collar removably worn on a bird for protection from feather picking or other self-mutilations restricts a bird's neck movement and area of reach. The bird collar includes a collar body which is wrapped around the neck of the bird and fastened with a fastener and a removable insert which provides rigidity to the collar body and allows the collar body to be cleaned when removed. An inner odor eliminating substance is provided in close proximity to the surface of the collar body which is in contact with the bird.

20 Claims, 4 Drawing Sheets

(56) References Cited

U.S. PATENT DOCUMENTS

| | | | |
|---|---|---|---|
| 6,240,882 B1 * | 6/2001 | Gross | 119/850 |
| 6,286,463 B1 * | 9/2001 | Sykes | 119/858 |
| 6,422,177 B1 * | 7/2002 | Noguero | 119/856 |
| 6,526,920 B1 * | 3/2003 | Griffin | 119/850 |
| 6,651,595 B1 | 11/2003 | Nelson | |
| 6,807,680 B2 * | 10/2004 | Sloot | 2/16 |
| 6,936,269 B2 * | 8/2005 | Robinson | 424/409 |
| 7,107,940 B2 * | 9/2006 | Abinanti | 119/792 |
| 7,168,394 B2 * | 1/2007 | Berry | 119/863 |
| 7,185,613 B2 * | 3/2007 | Arvanitis | 119/860 |
| 7,393,336 B2 * | 7/2008 | Sloot | 602/60 |
| 7,918,045 B2 * | 4/2011 | Riley | 40/633 |
| 7,946,254 B2 * | 5/2011 | Chao | 119/814 |
| 8,236,075 B2 * | 8/2012 | Yan et al. | 51/309 |
| 2006/0236953 A1 | 10/2006 | Hartman | |

\* cited by examiner

BIRD COLLAR

RELATED APPLICATIONS

Not Applicable.

FIELD OF THE INVENTION

The present invention relates generally to therapeutic animal collars, and in particular, to bird collar to prevent self mutilation from feather plucking or picking as the skin.

BACKGROUND OF THE INVENTION

Many varieties and breeds of bird often resort to self-mutilation during times of stress, injury, sickness, or nervousness. This self-mutilation often manifests itself with obsessive feather plucking or repeatedly picking at the skin. While normal grooming behavior is expected among birds, obsessive self-mutilation due to any reason can lead to further injury or even death.

Presently, bird owners have been left with few options to prevent this type of self-mutilation problem. One (1) such solution is the use of an Elizabeth collar which is intended to prevent the bird from excessive scratching, pecking, or feather plucking by restricting what the bird can reach with its beak. The Elizabeth collar is generally shaped like a truncated cone to prevent an animal from biting or licking at its body or scratching at its head or neck while wounds or injuries heal. The collar is generally attached to the pet's usual collar or around the neck with strings or tabs passed through holes punched in the sides of the plastic. The neck of the collar is short enough to let the animal eat and drink. Unfortunately, birds generally do not take well to wearing the Elizabeth collar since it makes it difficult for the bird to hold its head upright or walk. These collars can also get stuck in the bars of a bird cage and cause the bird to panic resulting in further and devastating injuries.

Other types of therapeutic bird collars attempt to solve this problem by removing the outwardly extending cone of the Elizabeth collar. However, these solutions are also not ideal and suffer from various disadvantages and deficiencies related to design or utilization. Particularly, current collars are often very uncomfortable for the bird due to size and weight and are prone to filth which can give rise to disease.

SUMMARY OF THE INVENTION

In view of these disadvantages, the inventor has recognized a lack in the art and observed that there is a need for a new therapeutic bird collar to prevent self-mutilation due to obsessive behavior which can lead to further injury or death. The development of the present invention, which will be described in greater detail herein, substantially departs from conventional solutions to provide a new and improved bird collar and in doing so fulfills this need.

In accordance with features and aspects of one exemplary embodiment consistent with the principles of the present disclosure, a bird collar is provides that can include a generally rectangular collar body having an exterior surface, an interior surface opposite the exterior surface, an upper edge, a lower edge, a closed side edge, an open side edge, and a hollow interior slot disposed between the exterior surface and the interior surface extending substantially between the closed side edge and the open side edge. An odor eliminating layer is disposed along an inner surface of the interior surface. An exterior surface fastener is disposed on the exterior surface adjacent to the open side edge. A generally rectangular resilient insert is removably coupled within the slot through the open side edge. The insert is a flat member suitably sized to be entirely inserted within the slot. The collar body and the insert, in combination, are adapted to form a cylindrical configuration when the closed side edge and the open side edge are brought together. A strap extends outwardly from the closed side edge and is configured to overlap the exterior surface about the open side edge. A strap fastener is disposed on an interior surface of the strap to matingly engage the exterior surface fastener when the collar body and the insert, in combination, are formed into the cylindrical configuration.

In accordance with features and aspects of another embodiment consistent with the principles of the present disclosure, the bird collar can also include a collar body that is fabricated of a soft fabric material.

In accordance with features and aspects of another embodiment consistent with the principles of the present disclosure, the bird collar can also include an insert that is fabricated of a semi-rigid metal material comprising sufficient flexibility along a longitudinal axis to form the cylindrical configuration and sufficient rigidity along a traverse axis to preclude bending.

In accordance with features and aspects of another embodiment consistent with the principles of the present disclosure, the bird collar can also include an insert that is fabricated of a semi-rigid plastic material comprising sufficient flexibility along a longitudinal axis to form the cylindrical configuration and sufficient rigidity along a traverse axis to preclude bending.

In accordance with features and aspects of another embodiment consistent with the principles of the present disclosure, the bird collar can also include an odor eliminating layer formed of an odor and moisture absorbent material. In another embodiment consistent with the principles of the present disclosure, the odor eliminating layer is formed of a fabric material containing particles of bamboo charcoal.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
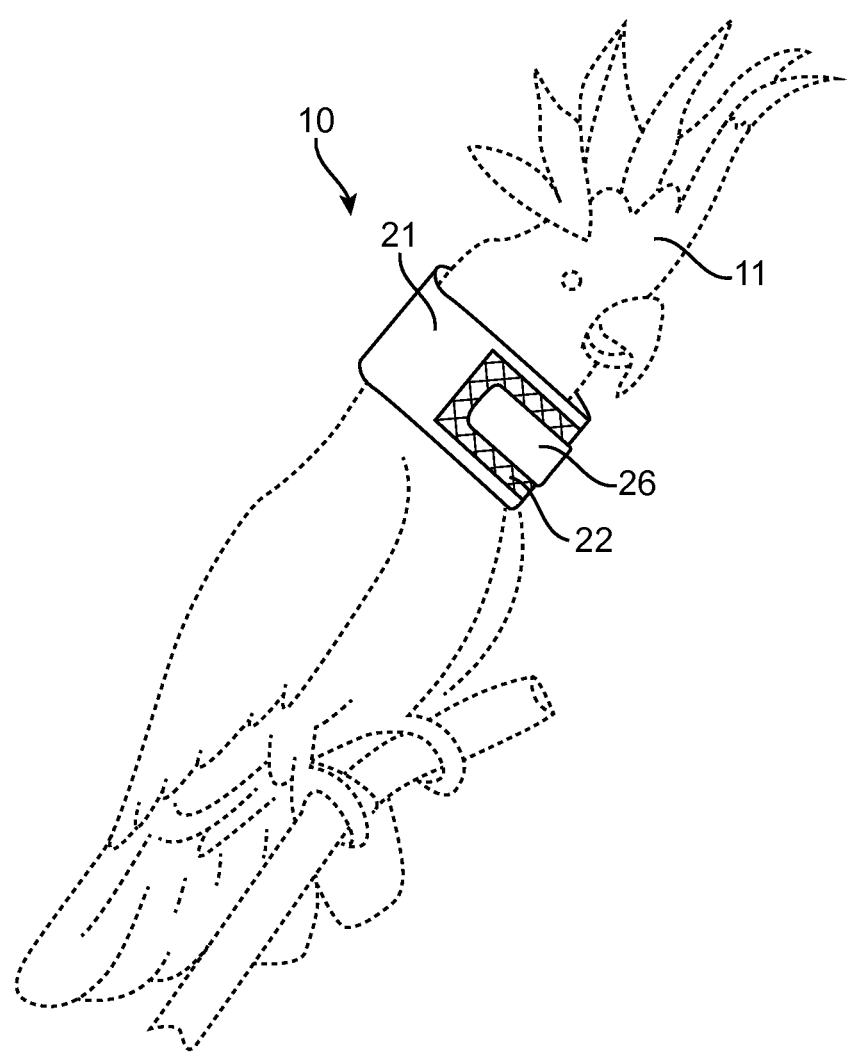
FIG. 1 is an environmental view of a bird collar, in accordance with the present invention.

DESCRIPTIVE KEY 10 bird collar
11 bird 20 collar body
21 exterior surface
22 exterior surface fastener
23 slot
24 insert
25 interior surface
26 strap
27 strap fastener
28 odor eliminating layer

DETAILED DESCRIPTION OF THE PREFERRED EMBODIMENT

In accordance with the invention, the best mode is presented in terms of certain embodiments, herein depicted within FIGS. 1 through 4. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps or functions without precluding one or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring now to FIGS. 1 through 4, depicting a bird collar, identified generally by reference to an apparatus 10, where like reference numerals represent similar or like parts. In accordance with the teachings of the present disclosure, the apparatus 10 generally provides support to the neck region of a bird 11 and prohibits the bird 11 from mutilating themselves due to injury or similar ailment.

Referring first to FIG. 1, which illustrates the apparatus 10 in use upon a bird 11. The apparatus 10 generally includes a collar body 20, an insert 24 removably coupled within the collar body 20, and a fastening strap 26. The apparatus 10 can be fabricated in various sizes to accommodate many different breeds of bird or domesticated fowl. The apparatus 10 is suitably sized to substantially encompass the neck of the bird 11, generally below the throat and above the breast.

Figure 2:
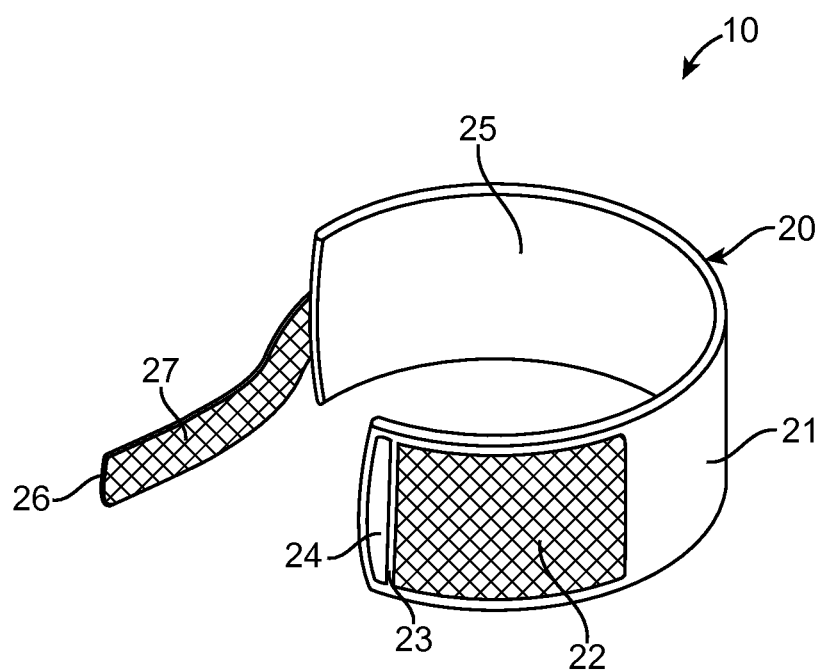
FIG. 2 is a perspective view of the bird collar.

Referring next to FIG. 2, the collar body 20 is a generally rectangular member preferably fabricated from a flexible and soft looped synthetic or natural fabric having an exterior surface 21 which is positioned away from the bird 11 and an interior surface 25 which is in contact with the neck of the bird 11. The apparatus 10 is designed to wrap around the neck of the bird 11 and is secured in a generally circular closed position by the fastening strap 26 to form a generally cylindrical structure. The strap 26 is preferably also made of a soft flexible material. The strap 26 is affixed at one end to a closed perimeter side edge of the collar body 20 and includes a strap fastener 27. The strap fastener 27 is disposed on an underside interior surface of the strap 26 to overlap and make contact with the exterior surface 21 of the collar body 20 when in the closed position. The strap fastener 27 matingly engages an exterior surface fastener 22 which is adhered, sewn, or otherwise affixed to an end portion of the exterior surface 21 of the apparatus 10 opposite the strap 26. The fasteners 22, 27 are preferably hook-and-loop fasteners, yet other fastening devices can be utilized with equal benefit and is not meant to be limiting in any manner.

Figure 3:
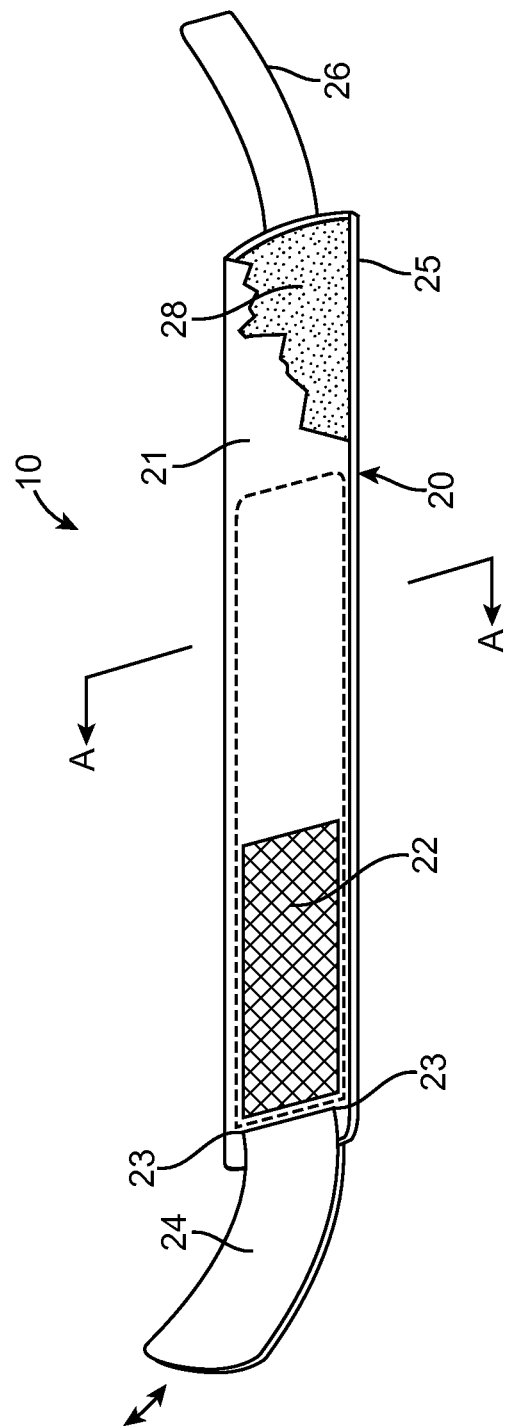
FIG. 3 is a partial cut-away perspective view of the bird collar depicted with an insert partially removed, in accordance with the present invention; and, FIG. 4 is a section view of the bird collar taken along line A-A of FIG. 3, in accordance with the present invention.
Figure 4:
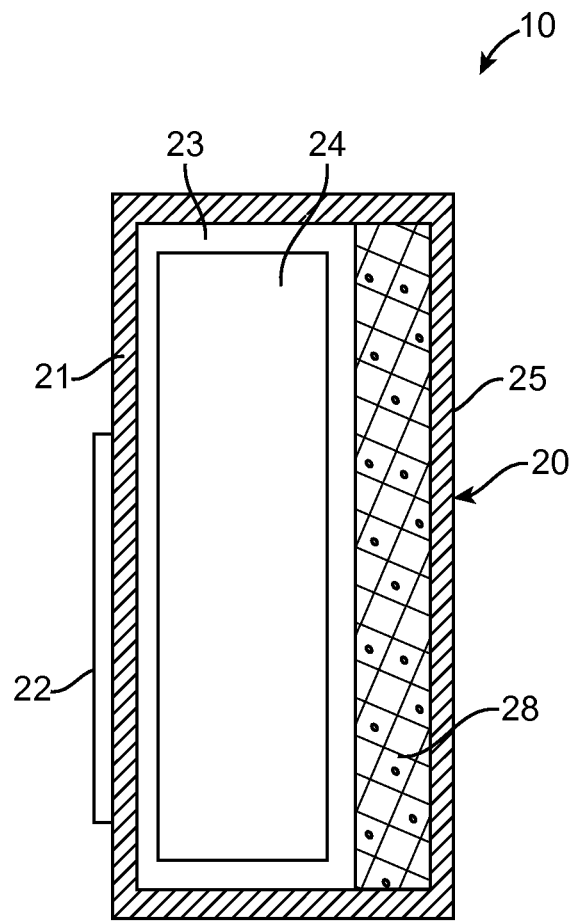

Referring now to FIGS. 3 and 4, which more clearly show the relationship of the collar body 20 and the insert 24 as well as the various layers of the collar body 20. The collar body 20 includes a slot 23 which enables insertion and placement of the insert 24. An open perimeter side edge of the collar body 20 opposite the closed side edge includes an opening for accessing the slot 23. The insert 24 is preferably a thin, flat generally rectangular length of flexible plastic or metal which provides rigidity to the apparatus 10 along a traverse axis. Once installed around a bird's neck, the apparatus 10 limits the range of motion of the bird's head and prohibits the bird 11 from reaching an area which may be irritated or bothersome which compels the bird 11 mutilate itself by pecking at its skin or pulling out its feathers.

The insert 24 is removed so the collar body 20 can be washed or cleaned when needed. The insert 24 is suitably sized slightly smaller than the width and length of the collar body 20 to enable proper placement and retention completely within the slot 23. The insert 24 is routed against an odor eliminating layer 28 disposed within the collar body 20.

The odor eliminating layer 28 fixed within the collar body 20 adjacent to and behind the interior surface 25, thereby being in close proximity to the neck of the bird 11. The interior odor eliminating layer 28 absorbs and eliminates odors caused by the bird 11. The odor eliminating layer 28 extend the length of the collar body 20. The odor eliminating layer 28 is preferably fabricated from a bamboo charcoal fabric, containing nano-particles of bamboo charcoal in its fiber. The bamboo charcoal fabric includes antibacterial and antifungal properties and well as being a deodorizing material. It can be appreciated that other breathable odor absorbing materials can also be used with equal benefit and is not meant to be limiting in any manner.

It can be appreciated by one skilled in the art that other styles and configurations of the present invention can be easily incorporated into the teachings of the present disclosure and only certain particular configurations have been shown and described for purposes of clarity and disclosure and not by way of limitation of scope.

In accordance with the principles of the present invention, the apparatus 10 can be installed and utilized by the user in a simple and effortless manner with little or no training in general accordance with FIG. 1 through FIG. 4. It can be appreciated that the steps required to utilize the apparatus 10, as described, can performed in alternative order and as such should not be viewed as a limiting factor.

The method of utilizing the apparatus 10 can be achieved by performing the following steps: acquiring the apparatus 10; inserting the insert 24 completely within the collar body 20 through the slot 23; wrapping the apparatus 10 around the neck of the bird 11 with the interior surface 25 positioned against the bird 11; fastening the apparatus 10 in the closed position around the bird's neck with the fasteners 22, 27; enabling the odor eliminating layer 28 to absorb odors from the bird 11; removing the apparatus 10 from the bird 11 as desired; removing the insert 24 from the collar body 20 for cleaning as needed; and, utilizing the apparatus 10 to support to a birds 11 neck and prohibit the bird 11 from mutilating itself.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A bird collar comprising:
   a collar body comprising an exterior surface, an interior surface opposite said exterior surface, and, an interior slot disposed between said exterior surface and said interior surface;
   a odor eliminating layer disposed along an inner surface of said interior surface;
   an exterior surface fastener disposed on said exterior surface;
   an insert removably coupled within said slot, wherein said collar body and said insert in combination are adapted to form a cylindrical configuration;
   a strap affixed to a side edge of said collar body opposite an opening of said slot; and,
   a strap fastener disposed on an interior surface of said strap to matingly engage said exterior surface fastener when said collar body and said insert in combination are formed into said cylindrical configuration.

2. The collar of claim 1, wherein said collar body is fabricated of a soft fabric material.

3. The collar of claim 1, wherein said insert is fabricated of a semi-rigid metal material comprising sufficient flexibility along a longitudinal axis to form said cylindrical configuration and sufficient rigidity along a traverse axis to preclude bending.

4. The collar of claim 1, wherein said insert is fabricated of a semi-rigid plastic material comprising sufficient flexibility along a longitudinal axis to form said cylindrical configuration and sufficient rigidity along a traverse axis to preclude bending.

5. The collar of claim 1, wherein said exterior surface fastener and said strap fastener are each communicating strips of a hook-and-loop fastener.

6. The collar of claim 1, wherein said insert is a flat member suitably sized to be entirely inserted within said slot.

7. The collar of claim 1, wherein said odor eliminating layer comprises an odor and moisture absorbent material.

8. The collar of claim 1, wherein said odor eliminating layer comprises a fabric material containing particles of bamboo charcoal.

9. A bird collar comprising:
   a generally rectangular collar body comprising an exterior surface, an interior surface opposite said exterior surface, an upper edge, a lower edge, a closed side edge, an open side edge, and a hollow interior slot disposed between said exterior surface and said interior surface extending substantially between said closed side edge and said open side edge;
   a odor eliminating layer disposed along an inner surface of said interior surface;
   an exterior surface fastener disposed on said exterior surface adjacent to said open side edge;
   a generally rectangular resilient insert removably coupled within said slot through said open side edge, said insert comprising a flat member suitably sized to be entirely inserted within said slot, wherein said collar body and said insert in combination are adapted to form a cylindrical configuration when said closed side edge and said open side edge are brought together;
   a strap extending outwardly from said closed side edge and configured to overlap said exterior surface about said open side edge; and,
   a strap fastener disposed on an interior surface of said strap to matingly engage said exterior surface fastener when said collar body and said insert in combination are formed into said cylindrical configuration.

10. The collar of claim 9, wherein said collar body is fabricated of a soft fabric material.

11. The collar of claim 10, wherein said insert is fabricated of a semi-rigid metal material comprising sufficient flexibility along a longitudinal axis to form said cylindrical configuration and sufficient rigidity along a traverse axis to preclude bending.

12. The collar of claim 11, wherein said exterior surface fastener and said strap fastener are each communicating strips of hook-and-loop fastener.

13. The collar of claim 11, wherein said odor eliminating layer comprises an odor and moisture absorbent material.

14. The collar of claim 11, wherein said odor eliminating layer comprises a fabric material containing particles of bamboo charcoal.

15. The collar of claim 10, wherein said insert is fabricated of a semi-rigid plastic material comprising sufficient flexibility along a longitudinal axis to form said cylindrical configuration and sufficient rigidity along a traverse axis to preclude bending.

16. The collar of claim 15, wherein said exterior surface fastener and said strap fastener are each communicating strips of a hook-and-loop fastener.

17. The collar of claim 15, wherein said odor eliminating layer comprises an odor and moisture absorbent material.

18. The collar of claim 15, wherein said odor eliminating layer comprises a fabric material containing particles of bamboo charcoal.

19. The collar of claim 10, wherein said odor eliminating layer comprises an odor and moisture absorbent material.

20. The collar of claim 10, wherein said odor eliminating layer comprises a fabric material containing particles of bamboo charcoal.

* * * * *